(12) United States Patent
Barreteau et al.

(10) Patent No.: US 10,596,507 B2
(45) Date of Patent: Mar. 24, 2020

(54) ROTATING COALESCER

(71) Applicant: Cummins Filtration Sarl, Quimper (FR)

(72) Inventors: Anthony Barreteau, Quimper (FR); Kevin Maguer, Quimper (FR); Chirag D. Parikh, Madison, WI (US); Lee A. Peck, Stoughton, WI (US); Benjamin L. Scheckel, Stoughton, WI (US); Emmanuel Page, Tremeoc (FR); Erwan Guyomard, Loc Brevalaire (FR); Gérard Malgorn, Quimper (FR); Stéphane Le Guyader, Briec (FR); Gauthier Mestdag, Plogastel Saint Germain (FR); Guy Auffret, Fouesnant (FR)

(73) Assignee: CUMMINS FILTRATION SARL, Quimper (FR)

( * ) Notice: Subject to any disclaimer, the term of this patent is extended or adjusted under 35 U.S.C. 154(b) by 166 days.

(21) Appl. No.: 15/740,580

(22) PCT Filed: Jun. 15, 2016

(86) PCT No.: PCT/EP2016/063694
§ 371 (c)(1),
(2) Date: Dec. 28, 2017

(87) PCT Pub. No.: WO2017/005467
PCT Pub. Date: Jan. 12, 2017

(65) Prior Publication Data
US 2018/0185778 A1 Jul. 5, 2018

(30) Foreign Application Priority Data
Jul. 3, 2015 (FR) ...................... 15 56346

(51) Int. Cl.
| | | |
|---|---|---|
| B01D 46/00 | (2006.01) | |
| B01D 46/26 | (2006.01) | |
| B01D 45/14 | (2006.01) | |
| F01M 13/02 | (2006.01) | |
| F01M 13/04 | (2006.01) | |

(52) U.S. Cl.
CPC ......... B01D 46/0056 (2013.01); B01D 45/14 (2013.01); B01D 46/003 (2013.01);
(Continued)

(58) Field of Classification Search
CPC .. B01D 46/0056; B01D 46/26; B01D 46/003; B01D 45/14; F01M 13/02; F01M 13/04; F01M 2013/0422; F01M 2013/0438
See application file for complete search history.

(56) References Cited

U.S. PATENT DOCUMENTS

| | | |
|---|---|---|
| 3,857,687 A | 12/1974 | Hamilton et al. |
| 6,925,993 B1 | 8/2005 | Eliasson et al. |

(Continued)

FOREIGN PATENT DOCUMENTS

| | | |
|---|---|---|
| DE | 195 22 855 A1 | 1/1997 |
| DE | 20 2007 009 913 U1 | 12/2008 |
| WO | WO 2007/133161 A1 | 11/2007 |

OTHER PUBLICATIONS

French Search Report Issued for French Patent Application No. FR 1556346, dated Apr. 25, 2016, 6 pages.
(Continued)

*Primary Examiner* — Robert Clemente
(74) *Attorney, Agent, or Firm* — Foley & Lardner LLP (57) ABSTRACT

Assembly to be used to filter a fluid, containing a housing (29) which comprises a housing base (50) and a housing upper part (30) connected removably to the housing base (50). An axial shaft (34, 35) extends at least partially through the filter element (32, 33) when the filter element (32, 33) is contained inside the housing (29). A lower bearing (44) is (Continued)

arranged between the axial shaft (34, 35) and the housing base (50) and underneath the filter element (32, 33) when a filter element (32, 33) is contained inside the housing (29). The housing (29) is able to contain a filter element (32, 33) within it and the filter element (32, 33) fits onto the axial shaft (34, 35) in such a way that the axial shaft (34, 35) is rotationally coupled to the filter element (32, 33). The filter assembly (20, 120) has no bearing above the filter element (32, 33).

20 Claims, 10 Drawing Sheets

(52) U.S. Cl.
CPC .............. *B01D 46/26* (2013.01); *F01M 13/02* (2013.01); *F01M 13/04* (2013.01); *B01D 2271/02* (2013.01); *F01M 2013/0438* (2013.01)

(56) References Cited

U.S. PATENT DOCUMENTS

| | | |
|---|---|---|
| 7,476,266 B2 | 1/2009 | Hallgren et al. |
| 8,794,222 B2 | 8/2014 | Schwandt et al. |
| 8,807,097 B2 | 8/2014 | Schwandt et al. |
| 9,194,265 B2 | 11/2015 | Parikh et al. |
| 2010/0180854 A1 | 7/2010 | Baumann et al. |
| 2018/0169556 A1* | 6/2018 | Parikh ................ B01D 46/0031 |

OTHER PUBLICATIONS

PCT Search Report Issued for PCT/EP2016/063694, dated Aug. 17, 2016, 11 pages.

Office Action issued for Chinese Patent Application No. 2016800365313, dated May 21, 2019, including English language translation, 9 pages.

\* cited by examiner

ROTATING COALESCER

CROSS-REFERENCE TO RELATED APPLICATIONS

The present application is a National Stage of PCT Application No. PCT/EP2016/063694, filed Jun. 15, 2016, which claims priority to French Patent Application No. 1556346, filed Jul. 3, 2015. The contents of both applications are incorporated herein by reference in their entirety.

FIELD

The present application relates generally to filter assemblies.

BACKGROUND

Typically, in rotating coalescer filter assemblies, a filter element rotates within a housing to filter a fluid. In order to allow the filter element to rotate, a bearing may be positioned above the filter element to guide the movement and rotation of the filter element relative to the housing. However, the bearing may create problems within the filter assembly. For example, the bearing may not stay sufficiently lubricated, potentially resulting in a shorter life of the filter assembly. Additionally, while grease and/or a seal may be used in attempt to maintain the lubrication, such measures also increase the cost and the required materials for the filter assembly, while also increasing the level of the drag or friction within the filter assembly.

Additionally, the bearing above the filter element may create a potential by-pass route for the unfiltered fluid and/or the bearing lubricant between the clean and dirty sides of the filter element. This may result in a decrease in the efficiency of the filter assembly. In order to prevent such a by-pass from occurring, a seal may also be used within the filter assembly. Such a seal, however, may increase the cost, the required materials, and the drag within the filter assembly. Still further the bearing above the filter element may require a sliding adjustment (e.g., a fit with clearance, compared to a tight adjustment which is a fit without a clearance (e.g., a press-fit)) in order to authorize servicing. The sliding adjustment may create a rolling effect (e.g., when the inner ring of the bearing rotates in relation to the shaft), which may damage the axial shaft of the filter in operation.

SUMMARY

The invention described here concerns a filter assembly for use in filtering a fluid, comprising:
- a housing comprising a housing base and a housing upper portion removably connected to the housing base, the housing being sized and configured to contain a filter element therein;
- an axial shaft extending at least partially through the filter element when the filter element is contained within the housing, the filter element fitting onto the axial shaft such that the axial shaft is rotationally coupled with the filter element; and
- a lower bearing disposed between the axial shaft and the housing base and below the filter element when the filter element is contained within the housing,
wherein the filter assembly does not include a bearing above the filter element.

According to a possible variant, a filter assembly according to the invention further comprises the filter element contained within the housing.

According to a possible variant, the axial shaft and the filter element rotate together independent of and relative to the housing.

According to a possible variant, the filter element is a coalescer filter element.

According to a possible variant, a filter assembly according to the invention further comprises a driving wheel disposed below the filter element, the driving wheel configured to rotate the axial shaft relative to the housing.

According to a possible variant, a filter assembly according to the invention further comprises an upper bearing disposed between the axial shaft and the housing base and below the filter element, the upper bearing axially aligned with the lower bearing along the axial shaft.

According to a possible variant, the upper bearing is disposed above a driving wheel and the lower bearing is disposed below the driving wheel.

According to a possible variant, the upper bearing and the lower bearing are disposed between the filter element and the driving wheel.

According to a possible variant, the housing base includes a base cap positionable within an upper opening of the housing base and above a driving wheel.

According to a possible variant, the upper bearing is positionable within the base cap, and wherein the base cap includes a shroud that directs a fluid to be filtered into the filter element and bearing lubricant toward the upper bearing.

According to a possible variant, the filter element includes a plurality of blades (64) extending in a plane perpendicular to a longitudinal axis of the axial shaft.

According to a possible variant, the plurality of blades are configured to increase the pumping of the fluid.

According to a possible variant, the lower bearing is disposed within a center hub of the housing base, and wherein the axial shaft rotates within the center hub.

According to a possible variant, the housing base includes a plurality of ribs radially extending from the center hub to an outer wall of the housing base.

According to a possible variant, a driving wheel is positionable between the ribs and aligned with the axial shaft, the ribs allowing bearing lubricant to move to and from the driving wheel.

According to a possible variant, a filter assembly according to the invention further comprises a biasing member between the housing base and/or the axial shaft on the one hand, and the lower bearing and/or the upper bearing on the other hand.

According to a possible variant, a filter assembly according to the invention further comprises a first seal between the filter element and at least one of the following elements:
- the housing base,
- a base cap,
- and/or a basin.

According to a possible variant, a filter assembly according to the invention further comprises a basin configured to collect filtered fluid from the filter element.

According to a possible variant, a filter assembly according to the invention further comprises a second seal between the filter element and the housing upper portion.

According to a possible variant, a filter assembly according to the invention further comprises an upper bearing, wherein the upper bearing and the lower bearing are fitted to the axial shaft by an axial frame.

Various embodiments provide for an assembly for use in filtering a fluid including a housing that includes a housing base and a housing upper portion removably connected to the housing base, an axial shaft extending at least partially through the filter element when the filter element is contained within the housing, and a lower bearing disposed between the axial shaft and the housing base and below the filter element when the filter element is contained within the housing. The housing is capable of containing a filter element therein, and the filter element fits upon the axial shaft such that the axial shaft is rotationally coupled with the filter element. The filter assembly does not include a bearing above the filter element.

These and other features (including, but not limited to, retaining features and/or viewing features), together with the organization and manner of operation thereof, will become apparent from the following detailed description when taken in conjunction with the accompanying drawings, wherein like elements have like numerals throughout the several drawings described below.

DETAILED DESCRIPTION

Referring to the figures generally, the various embodiment disclosed herein relate to a filter assembly for filtering fluid. More specifically, by eliminating the bearing above the filter element and adding a bearing beneath the filter element, mechanisms described herein may provide a filter assembly with improved lubrication within the bearings, no rolling effect, no risk of by-pass between the clean and dirty sides of the filter element, a lower pressure drop across the filter element, and a tighter, improved fit between the axial shaft and the housing. Accordingly, the reliability and performance of the filter assembly is improved, the manufacturing is more simple and straightforward. Furthermore, since the tolerance stack-up and the part dilatation are less critical within the filter assembly, a simple wave washer may be used instead of a more complex compensation or adjustment system (which may comprise a spring and a sliding component) that can be used to compensate for any dimensional variation due to manufacturing tolerances and dilatation.

Figure 1A:
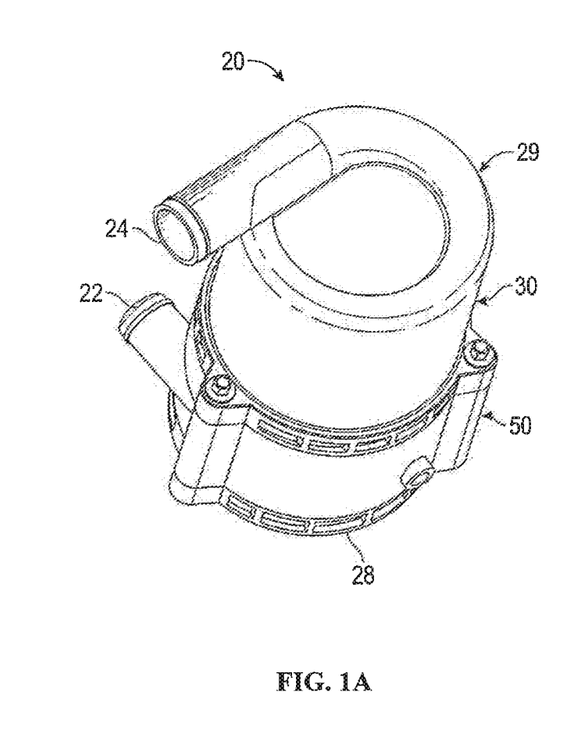
FIGS. 1A and 1B are top perspective and bottom perspective views, respectively, of a filter assembly according to one embodiment.
Figure 1B:
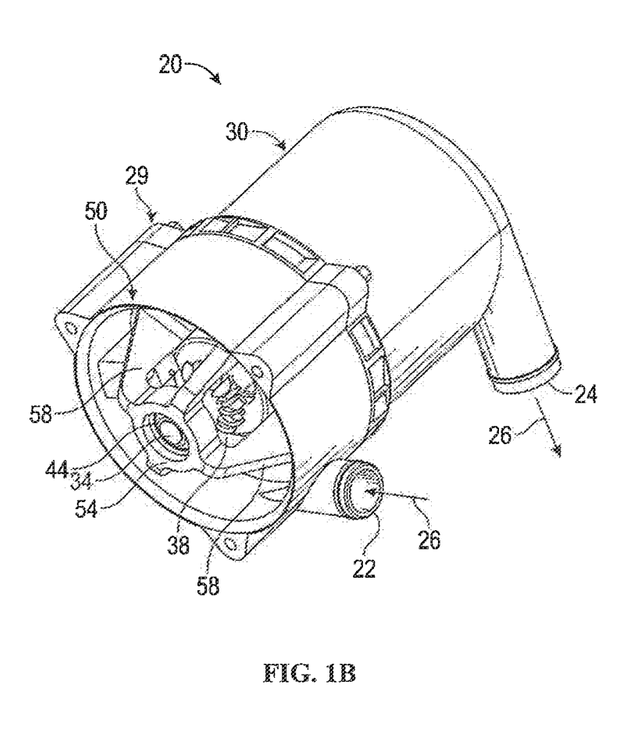
Figure 1C:
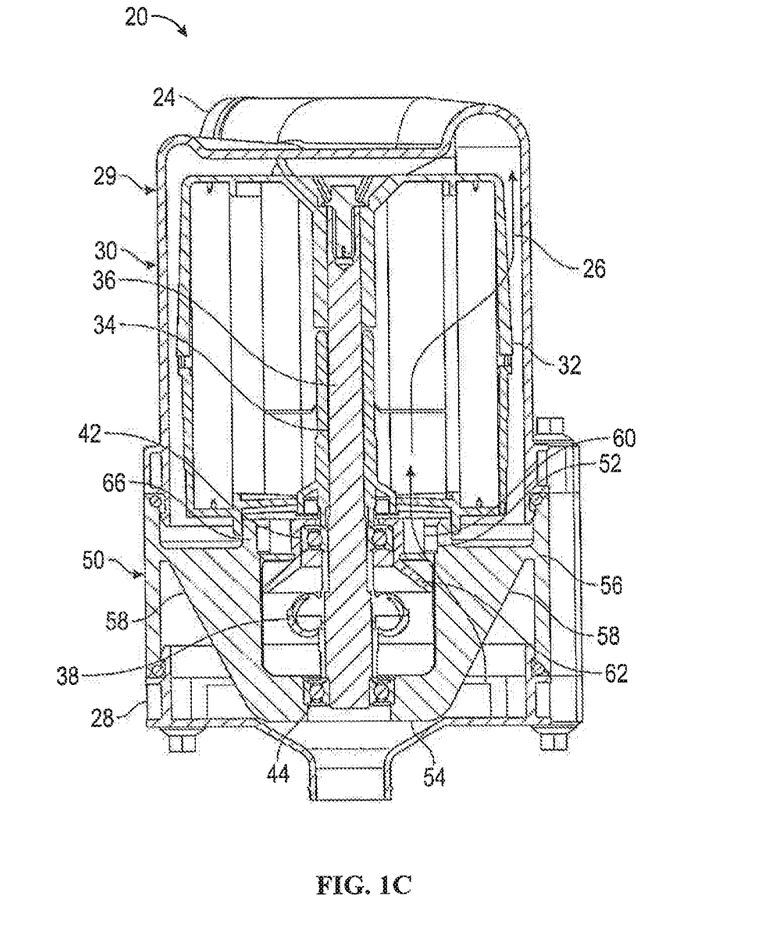
FIG. 1C is a cross-sectional view of the filter assembly of FIG. 1A.

Referring to FIGS. 1A-1C, there is shown a filter assembly 20 with an inlet 22 for unfiltered fluid to enter into the filter assembly 20 and an outlet 24 for filtered fluid to flow exit out of the filter assembly 20 (as shown by the flow 26 of fluid). However, it is understood that the inlet 22 and the outlet 24 may be reversed. The filter assembly 20 may utilize a variety of different filtering techniques to filter the fluid. The filter assembly of FIGS. 1A-1C comprises a rotating coalescer or filter and may further be hydraulically-driven. The filter assembly 20 may be a crankcase ventilation system.

The filter assembly 20 comprises an enclosure or housing 29 that includes a housing top or upper portion 30 and a housing base 50. The housing upper portion 30 and the housing base 50 are removably connectable or attachable to each other to house or contain a cartridge or filter element 32. The filter element 32 shown in FIGS. 1A-IC is surrounded by and positioned or disposed within the housing 29. The filter element 32 may include filter media and endcaps. The housing 29 may further include an additional housing end, cap, or lid 28 that may be attachable to an end of the housing base 50 to enclose an end of the housing 29 of the filter assembly 20.

Figure 6A:
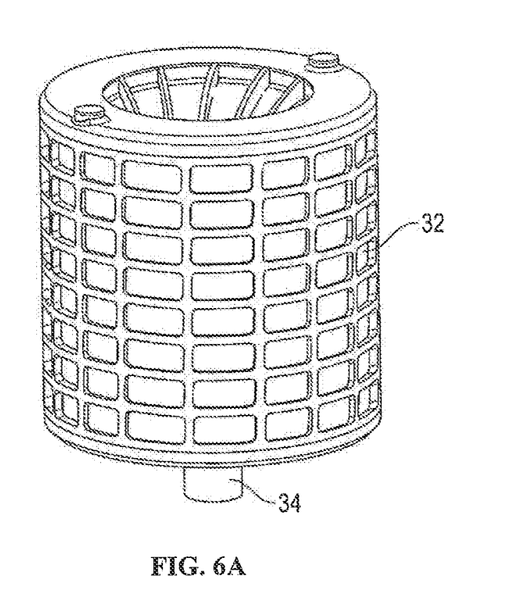
FIG. 6A is a perspective view of filter element and an axial shaft that can be disposed within the filter assembly of FIG. 1A.

As shown in FIG. 2C, the filter element 32 is rotatable within the housing 29 to filter the unfiltered fluid. In order to optimize the space within the filter assembly 20, the filter element 32 may be in direct contact with or about the upper bearing 42 within the housing base 50 (e.g., the top of the inner bushing of the upper bearing 42) or may be completely supported by the axial shaft 34 (with, for example, a groove or thrust), according to the desired configuration. One embodiment of the filter element 32 is shown in FIG. 6A.

An axial shaft 34 extends at least partially through the filter element 32 and may be connected with the filter element 32 such that the axial shaft 34 and the filter element 32 rotate congruently. The filter element 32 may fit over the axial shaft 34. The axial shaft 34 and the filter element 32 may be rotationally coupled together such that the axial shaft 34 and the filter element 32 are coupled or attached to each other and rotation of the axial shaft 34 causes a corresponding rotation of the filter element 32 about a rotation axis or a longitudinal axis 36 of the axial shaft 34 within and relative to the housing 29. Accordingly, the axial shaft 34 and the filter element 32 may rotate with each other. The axial shaft 34 and the filter element 32 may rotate together independent of and relative to the housing 29. The axial shaft 34 extends beyond a lower end of the filter element 32 in order to rotatably attach with the housing base 50.

Figure 8:
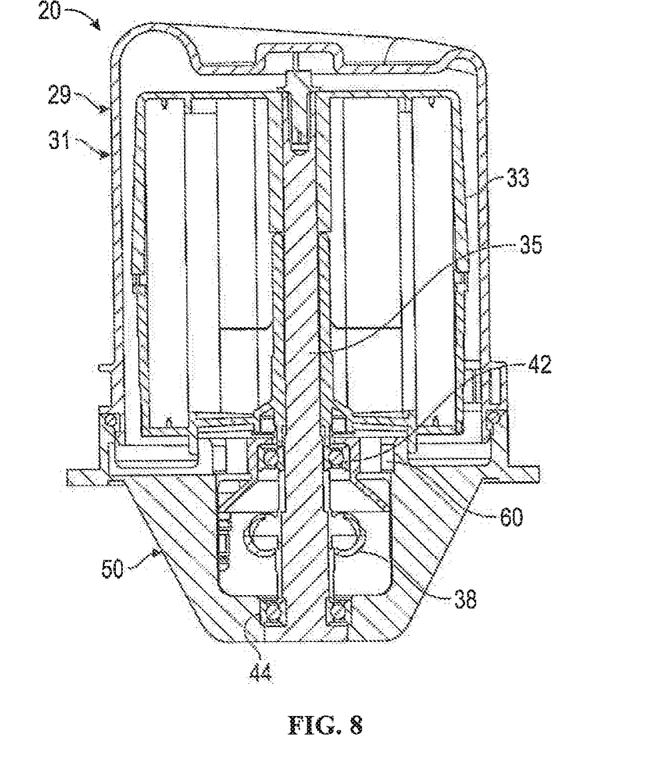
FIG. 8 is a cross-sectional view of a filter assembly according to another embodiment.

Although the axial shaft 34 may extend beyond an upper end of the filter element 32, it is not required for the axial shaft 34 to extend above the upper end of the filter element 32. As shown in FIG. 1C, the axial shaft 34 is recessed within the upper end of the filter element 32. According to another embodiment and as shown in FIG. 8, the axial shaft 35 extends beyond the upper end of the filter element 33, but does not contact the housing upper portion 31 of the housing 29. The housing upper portion 30 may optionally have a recess for a portion of the axial shaft 35 to extend within.

In order to rotate the axial shaft 34 relative to the housing 29, a driving wheel 38 may be used. As shown in FIG. 1C, the driving wheel 38 is attached to a portion of the axial shaft 34 that extends beneath the filter element 32. The driving wheel 38 may be in direct contact with one or both of the upper bearing 42 and the lower bearing 44, or the driving wheel 38 may be completely supported by the axial shaft 34 (with, for example, a groove or thrust), according to the desired configuration.

In order to provide improved performance within the filter assembly 20, all of the bearings, such as the upper bearing 42 and the lower bearing 44, within the filter assembly 20 are located beneath the filter element 32, when the filter element 32 is properly installed. Accordingly, when in operation, the filter assembly 20 does not include bearings above the filter element 32. For example, as shown in FIG. 1C, the filter assembly 20 includes an upper bushing or bearing 42 and a lower bushing or bearing 44, both located beneath the filter element 32. The upper bearing 42 and the lower bearing 44 are affixed to the axial shaft 34. Optionally, an inner rotating portion of the upper bearing 42 may be connected to a lower portion of the filter element 32. Positioning or disposing the upper bearing 42 and the lower bearing 44 beneath the filter element 32 allows the bearings 42 and 44 to have sufficient bearing lubricant and to be easily relubricated. This arrangement also prevents a bypass between the dirty and clean sides of the filter element 32. Additionally, the axial shaft 34 has a tighter fit with the housing base 50, resulting in a more robust filter assembly 20. According to another embodiment, the upper bearing 42 and the lower bearing 44 may be a single, double-row bearing.

The upper bearing 42 and the lower bearing 44 are aligned along the axial shaft 34 and create a connection between the axial shaft 34 and the housing base 50. Both the upper bearing 42 and the lower bearing 44 are positioned around a portion of the axial shaft 34 that extends below the filter element 32. According to one embodiment and as shown in FIG. 1C, the upper bearing 42 is positioned or disposed above the driving wheel 38 and the lower bearing 44 is positioned or disposed below the driving wheel 38 (i.e., the driving wheel 34 is positioned below the upper bearing 42 and above the lower bearing 44), thus creating a secure and stable connection between the axial shaft 34 and the housing base 50. According to another embodiment and as shown in the filter assembly 120 in FIG. 11A, both the upper bearing 42 and the lower bearing 44 are positioned or fitted between the filter element 32 and the driving wheel 38 for improved load distribution and a compact design. In order to fit between the filter element 32 and the driving wheel 38, the upper bearing 42, and optionally the lower bearing 44, may be higher than the bottom of the filter element 32.

As shown in FIG. 1C, the housing base 50, which may be a compact bearing block, houses both the upper bearing 42 and the lower bearing 44, thus ensuring and improving bearing alignment, lubrication, and fitting. The housing base 50 may reduce the cost of the filter assembly 20 by allowing the components of the filter assembly 20 to be easily adjusted and/or removed and simplifying the housing lid 28 and the drain sump. Additionally, since the housing upper portion 30 does not have to be centered (since the housing upper portion 30 does not include the bearings 42 or 44), the filter assembly 20 is more easily serviced.

Figure 2A:
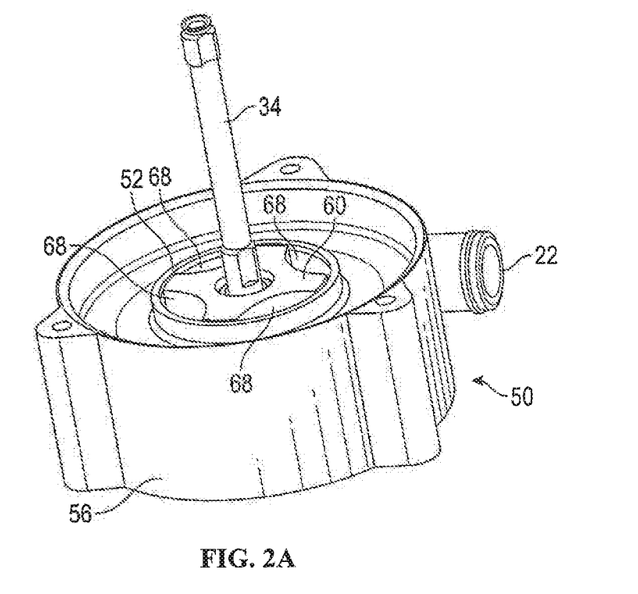
FIG. 2A is a top perspective view of a housing base, a base cap, and an axial shaft that can be disposed within the filter assembly of FIG. 1A.
Figure 2B:
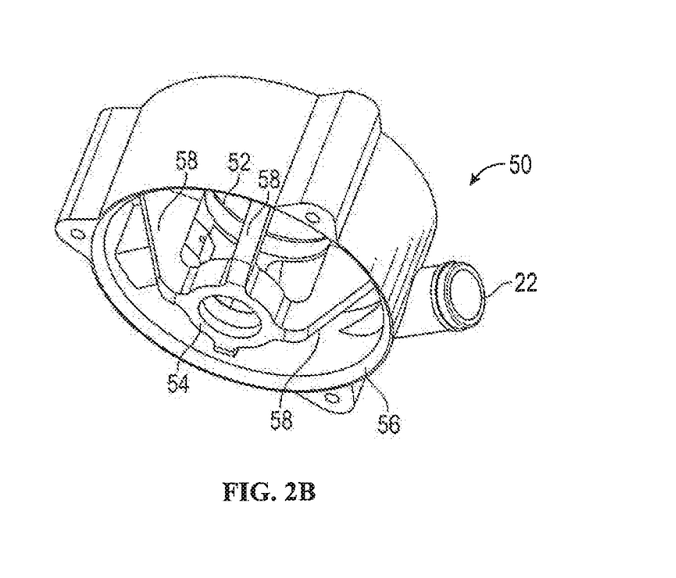
FIG. 2B is a bottom perspective views of a housing base that can be disposed within the filter assembly of FIG. 1A.

As shown in FIGS. 2A-2B, the housing base 50 is specifically shaped in order to attach with the upper bearing 42 and the lower bearing 44. For example, as shown in FIG. 2B, the housing base 50 includes a center hub 54 surrounded and secured by ribs 58 that extend radially from the center hub 54 to an inner surface of an outer wall 56 of the housing base 50. As shown in FIG. 1C, the axial shaft 34 and the lower bearing 44 are concentrically positioned or disposed within the center hub 54, thereby allowing the axial shaft 34 to rotate within the center hub 54.

The hub 54 and the ribs 58 allow the lower bearing 44 to be secured beneath the driving wheel 38 (while the upper bearing 42 is secured above the driving wheel 38). Additionally, the hub 54 and the ribs 58 align the lower bearing 44 and the upper bearing 42 by aligning the center of the hub 54 with the center of the upper opening 52 of the housing base 50 (in which the upper bearing 42 is positioned, as described further herein).

The ribs 58 are spaced apart from each other such that bearing lubricant can move between the ribs 58 (e.g., to and from the driving wheel 38), thus ensuring proper lubrication for the driving wheel 38, the upper bearing 42, and/or the lower bearing 44. The bearing lubricant may include various types of oil known in the art. Accordingly, as shown in FIGS. 1B-1C, the driving wheel 38 is positioned or disposed between the ribs 58 and aligned with the longitudinal axis 36 of the axial shaft 34, such that the driving wheel 38 may rotate in the middle of the assembly of ribs 58 and stay properly lubricated.

Figure 9:
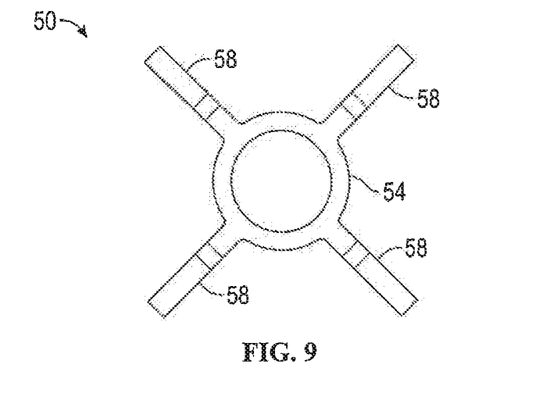
FIG. 9 is a bottom view of a portion of a housing base that can be disposed in a filter assembly according to another embodiment.

Additionally, the ribs 58 may have a variety of different shapes and configurations, such as radial and parallel to the longitudinal axis 36 or angled to the longitudinal axis 36 in order to optimize the movement of bearing lubricant (entrance or evacuation) to and from the driving wheel 38 and/or the upper bearing 42. The ribs 58 may extend radially in straight lines (as shown in FIG. 2B) or in curved lines (as shown in FIG. 9) from the center hub 54 of the housing base 50.

As shown in FIGS. 1C and 2A, the housing base 50 includes a base cap 60 positioned or disposed at least partially within the upper opening 52 of the housing base 50 and above the driving wheel 38. The base cap 60 may be attached to the upper opening 52 through a variety of different methods, including a frictional fit (e.g., a tight fit). The upper bearing 42 is positioned or disposed within the base cap 60 and surrounds the axial shaft 34 such that the axial shaft 34 extends through and is rotatable within the base cap 60. With the axial shaft 34 and/or the upper bearing 42, the base cap 60 may close the upper opening 52 of the housing base 50.

Figure 3:
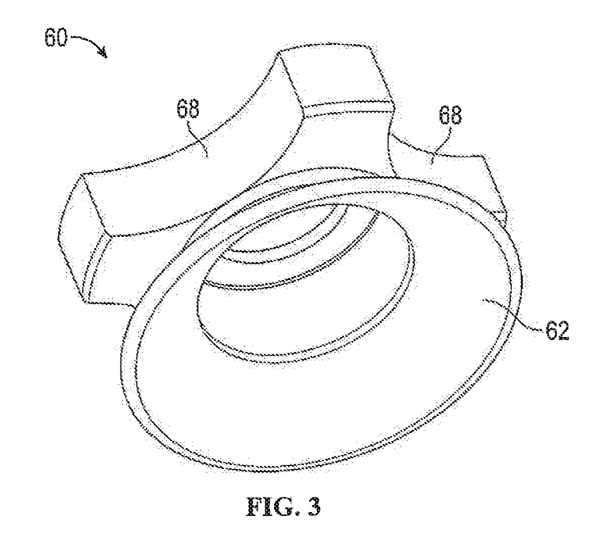
FIG. 3 is a bottom perspective view of a base cap that can be disposed within the filter assembly of FIG. 1A.

As shown in FIGS. 2A and 3, the base cap 60 includes base cap inlets 68 along certain areas of the periphery of the top portion of the base cap 60 to direct the flow 26 of fluid through the housing base 50, between the upper opening 52 of the housing base 50 and the base cap 60, and into the filter element 32. According to one embodiment, the base cap inlets 68 are indentations or cutouts within the base cap 60.

Figure 4:
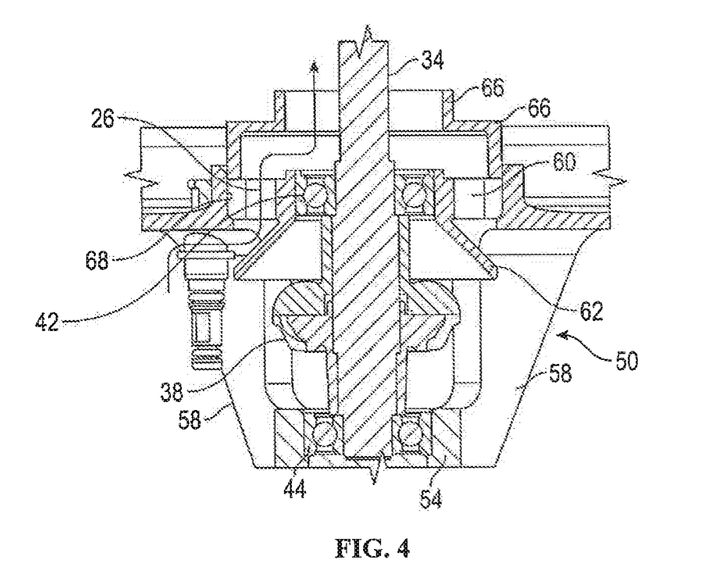
FIG. 4 is a cross-sectional view of a portion of a filter assembly according to another embodiment.

As shown in FIGS. 1C and 3, the base cap 60 includes a shroud 62 that extends radially from a center portion of the base cap 60 and beneath the base cap inlets 68. The shroud 62 is used to maintain a separation between the bearing lubricant (e.g., oil) and the flow 26 of fluid to be filtered. For example, the shroud 62 directs the flow 26 of unfiltered fluid into the filter element 32 (e.g., through the base cap inlets 68) while directing the bearing lubricant toward the upper bearing 42. The shroud 62 also prevents the unfiltered fluid from moving into the upper bearing 42 or the oil bearing lubricant moving into the filter element 32. Accordingly, as shown in FIG. 4, the shroud 62 has an inverted cone shape to direct the fluid and the bearing lubricant toward their respective areas within the filter assembly 20.

Figure 12A:
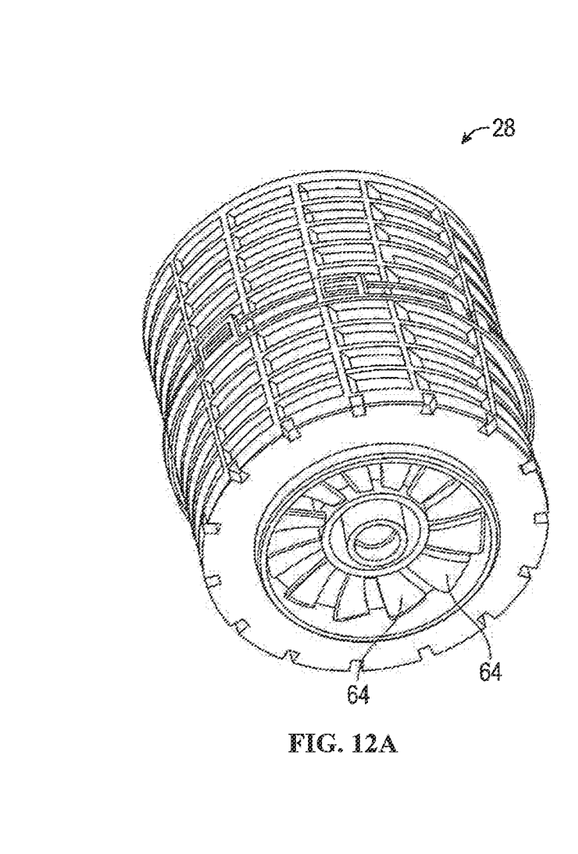
FIGS. 12A-12B are perspective views of a filter element with blades according to another embodiment.
Figure 12B:
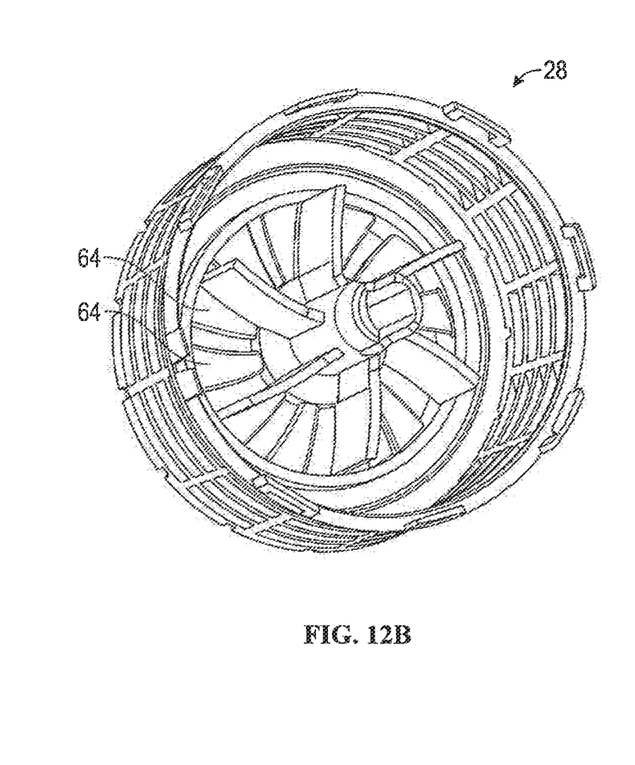

According to one embodiment as shown in FIGS. 12A-12B, a bottom end cap of the filter element 28 has at least one blade 64 (or a plurality of blades) in order to increase the pumping of the blow-by fluid from the crankcase to the hollow interior of the filter element 32, thus reducing restriction within the filter assembly 20. The plurality of blades 64 extend in a plane perpendicular to the longitudinal axis 36 of the axial shaft 34. The blades 64 may be an extension of the vanes shown in U.S. Pat. No. 8,794,222, the entire disclosure of which is incorporated herein by reference.

Figure 10:
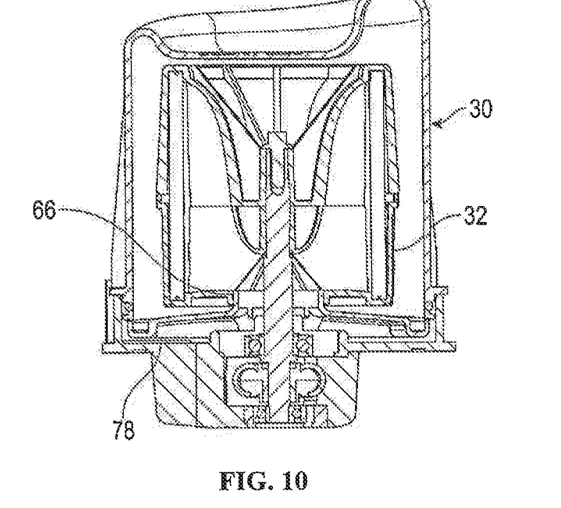
FIG. 10 is a cross-sectional view of a filter assembly according to another embodiment.

A seal 66, which may be a dynamic seal, may be included to prevent leakage between the various components of the filter assembly 20 and to direct the flow 26 of fluid. The seal 66 may be positioned a variety of different areas within the filter assembly 20, depending on the desired configuration. As shown in FIG. 1C, the dynamic radial seal 66 is positioned or disposed between the filter element 32 and the housing base 50. According to another embodiment and as shown in FIG. 4, the dynamic seal 66 is positioned between the filter element 32 and the base cap 60 when the filter element 32 is attached to the base cap 60. Accordingly, the base cap 60 may be specifically shaped in order to reduce the diameter of the seal 66, thereby reducing the risk of by pass. According to yet another embodiment and as shown in the filter element in FIG. 10, the dynamic seal 66 is positioned between the filter element 32 and a basin 78. The basin 78 may be used to collect the filtered oil.

Figure 11A:
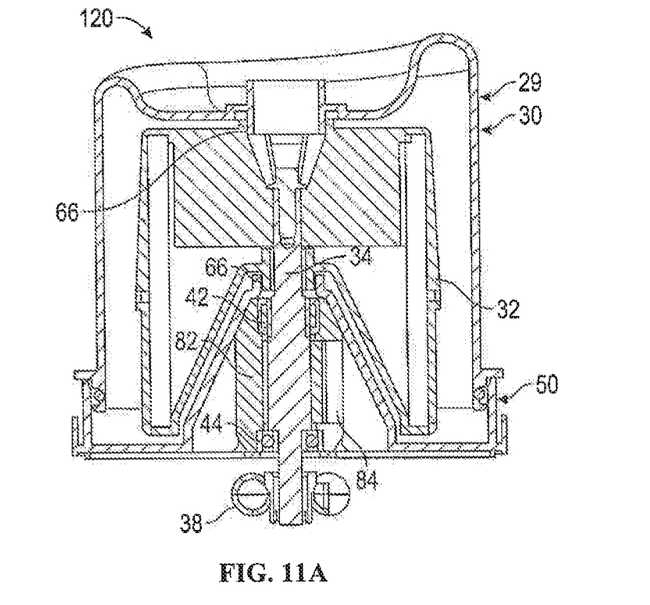
FIG. 11A is a cross-sectional view of a filter assembly according to yet another embodiment.

As shown in FIG. 11A, the filter assembly 120 includes two separate dynamic seals 66. A lower seal 66 (e.g., the first seal) may be positioned between the filter element 32 and the housing base 50 in order to avoid allowing blow-by gases from flowing directly from the crankcase to the clean side of the filter element 32 (e.g., through the top bearing 42). An upper seal 66 (e.g., the second seal) may be positioned between the filter element 32 and the housing upper portion 30 to avoid allowing blow-by gases from flowing directly from the inlet of the housing 29 to the clean side of the filter element 32.

Figure 5:
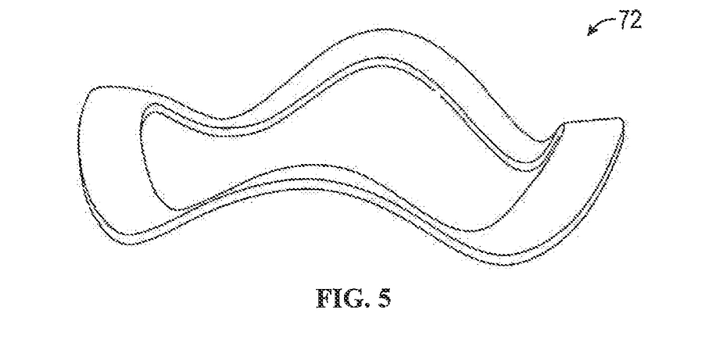
FIG. 5 is a perspective view of a biasing member that can be disposed within the filter assembly of FIG. 1A.

According to another embodiment, the filter assembly 20 includes a biasing member 72, which may be, for example, a wave spring (as shown in the embodiment in FIG. 5), in order to optimize the natural frequency of the filter assembly 20 and to compensate the part dimensional tolerances and dilatation. Depending on the desired or require bearing adjustments, the biasing member 72 may be positioned or disposed between the lower bearing 44 and the housing base 50 (axially aligned with and around the axial shaft 34), between the lower bearing 44 and the axial shaft 34, between the upper bearing 42 and the housing base 50, and/or between the upper bearing 42 and the axial shaft 34.

Figure 11B:
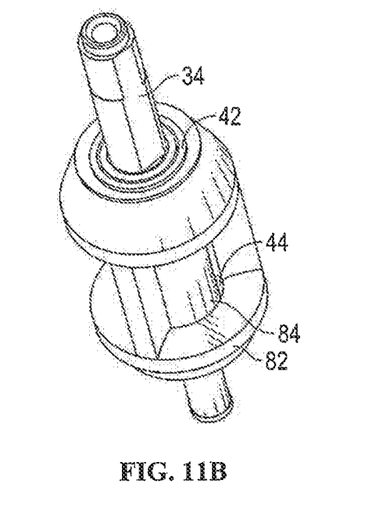
FIG. 11B is a perspective view of an axial frame and an axial shaft that may be disposed in the filter assembly of FIG. 11A.
Figure 11C:
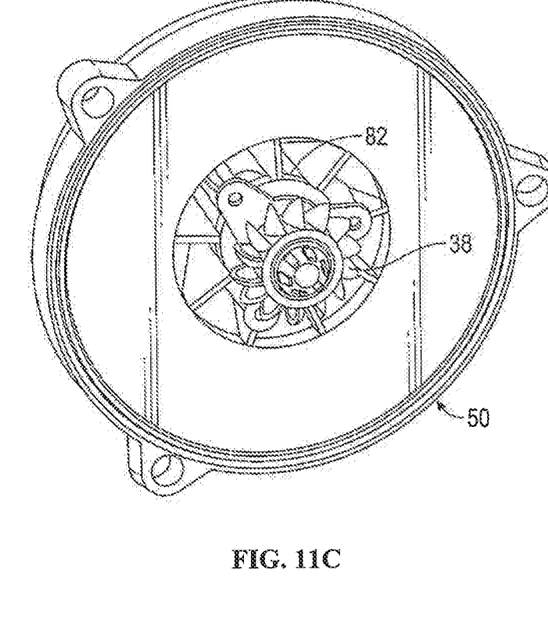
FIG. 11C is a rear perspective view of a housing base that may be disposed in the filter assembly of FIG. 11A.

According to another embodiment and as shown in the filter assembly 120 in FIGS. 11A-11C, both the upper bearing 42 and the lower bearing 44 may be fitted to the axial shaft 34 by an axial frame 82 within the housing base 50. The axial frame 82 may limit or reduce the amount of required material. The axial frame 82 substantially surrounds the outer circumferences of the upper bearing 42 and the lower bearing 44 and the upper bearing 42 and the lower bearing 44 surround the axial shaft 34. The axial frame 82 may hold the upper bearing 42 and the lower bearing 44 in alignment and at the proper distance apart along the axial shaft. The axial frame 82 includes openings 84 to maintain proper lubrication within the filter assembly 120.

The various components of the filter assembly 20 may be constructed out of a variety of different materials. For example, the housing base 50 and/or the base cap 60 may be constructed out of aluminum, plastic, or steel. The housing lid 28 and the drain sump may be plastic injected parts to further reduce the cost of the system.

In order to filter a fluid through the filter assembly 20, the filter element 32 is rotated relative to and within the housing upper portion 30 (which is attached to the housing base 50) by rotating the axial shaft 34 relative to the housing upper portion 30 and the housing base 50. Rotation of the driving wheel 38 may cause the axial shaft 34 to rotate. The upper bearing 42 and the lower bearing 44, both positioned or disposed within the housing base 50 and below the filter element 32, allow the axial shaft 34 to rotate relative to the housing base 50. As shown by the flow 26 of fluid, unfiltered fluid enters into the filter assembly 20 through the inlet 22, flows through the housing base 50 and the base cap 60, and is directed into and through the rotating filter element 32 for filtration. The shroud 62 on the base cap 60 may help direct the fluid into the filter element 32, as well as separately direct the bearing lubricant toward the upper bearing 42. The filtered fluid then exits the filter assembly 20 through the outlet 24. Coalesced material from the unfiltered fluid can exit the filter assembly 20 through a separate outlet, such as a drain, which may be located on the housing lid 28.

Measurements of Various Embodiments of the Filter Assembly 20

The filter assembly 20 may be able to handle an increased load applied on both the upper and lower bearings 42 and 44 due to, for example, filter out-of-balance. For example, according to a bearing calculation of one embodiment and as demonstrable using Equation 1 (below), a 30,000 hour bearing life may be achieved at 5,000 rpm with a maximum force of 245 N applied to the upper bearing 42 (or 115 N to the filter element 32) This translates into a filter element 32 with maximum 420 g·mm out-of-balance, which is achievable based on capability measurements. Although other dimensions within the filter assembly 20 are understood, the diameter of the filter element 32 may be approximately 100 mm, the height of the housing upper portion 30 may be approximately 106 mm, the diameter of the axial shaft 34 may be approximately 10 mm, and the vertical distance between the vertical midpoints of the upper bearing 42 and the lower bearing 44 may be approximately 47 mm, according to such an embodiment of the filter assembly 20.

$$L_{10} = \left(\frac{10^6}{60n}\right) \times \left(\frac{C_r}{P_r}\right)^3 \qquad \text{Equation 1}$$

$L_{10}$: Hours (h)

$n$: Speed (rpm)

$C_r$: Basic dynamic radial load rating ($N$)

$P_r$: Dynamic equivalent radial load ($N$)

Figure 6B:
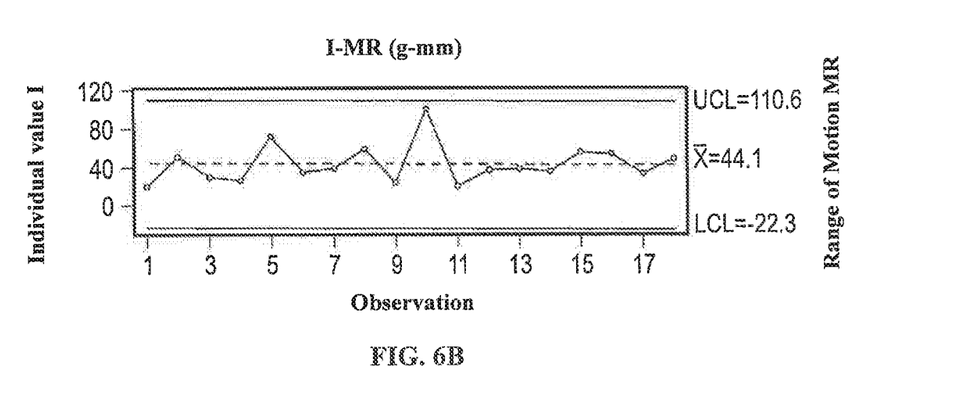
FIG. 6B is a chart of I-MR measurements of the filter element of FIG. 6A.

The filter element 32 with potting may be measured at an out-of-balance (e.g., amount of the filter unbalance) of approximately 40 g-mm. The seal 66 may be used to decrease the out-of-balance or various elements of the filter assembly 20 may be balanced with, for example, a saw stroke (e.g., a small cut or incision on one side of, for example, the filter element 32). An exemplary chart of the I-MR measurements (in g-mm) of a filter element 32 that has, approximately, a 101.6 mm height and a 101.6 mm diameter is shown in FIG. 6B. The I-MR chart of FIG. 6B shows exemplary individual observations (I chart) and moving ranges (MR chart) of filter out-of-balance measurements over time, and where UCL and LCL represent respectively the potential upper value and lower value of the individual values, $\bar{x}$ being the average thereof.

The gap between the axial shaft 34 and the center portion of the filter element 32 may be between approximately 0.05 to 0.15 mm radially. This gap may increase the out-of-balance by approximately 20 g-mm.

Figure 7:
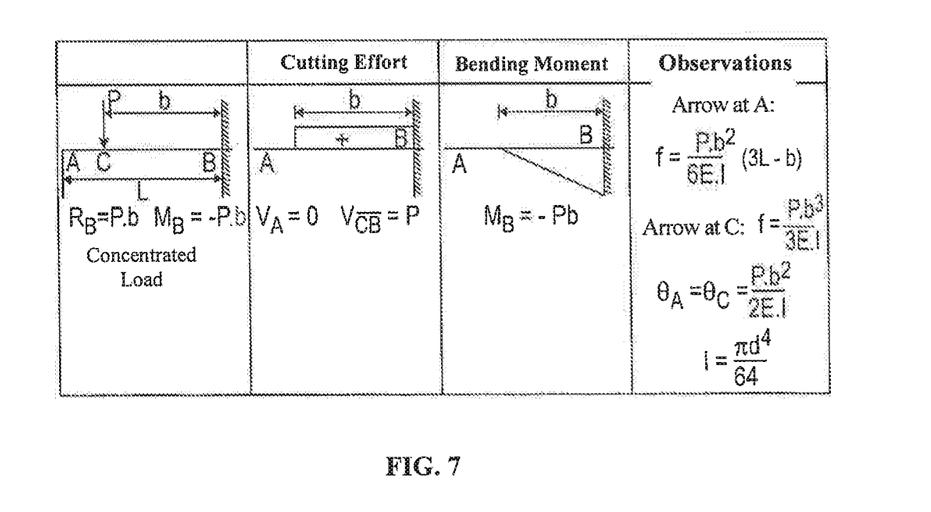
FIG. 7 are equations and respective pictorial depictions that can be used to calculate measurements within the filter assembly of FIG. 1A.

Furthermore, even if the shaft 34 may cantilever, any deformation of the shaft 34 within the filter assembly 20 remains insignificant. For example, based on the equations shown in FIG. 7, the deformation of the axial shaft 34 may be approximately 0.015 mm, where the lever arm is approximately 50 mm, the radial force is approximately 15 N, E=2.1 $10^{11}$ Pa, and the shaft diameter is approximately 10 mm.

It is anticipated that the various components, configurations, and features of the different embodiments of the filter assembly 20 may be combined according to the desired use and configuration.

As utilized herein, the terms "approximately," "about," "substantially" and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described without restricting the scope of these features to the precise numerical ranges provided. Accordingly, these terms should be interpreted as including insubstantial or inconsequential modifications or alterations of the subject matter described, and are considered to be within the scope of the disclosure.

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A filter assembly for use in filtering a fluid, comprising:
a housing including a housing base and a housing upper portion removably connected to the housing base, the housing sized and configured to contain a filter element therein, the housing base comprising a base cap;
an axial shaft extending at least partially through the filter element when the filter element is contained within the housing, the filter element fitting upon the axial shaft such that the axial shaft is rotationally coupled with the filter element;
a lower bearing disposed between the axial shaft and the housing base and below the filter element when the filter element is contained within the housing; and
an upper bearing positionable within the base cap,
wherein the filter assembly does not include a bearing above the filter element,
wherein the base cap comprises a shroud that directs a fluid to be filtered into the filter element and bearing lubricant toward the upper bearing.

2. The filter assembly of claim 1, further comprising the filter element contained within the housing.

3. The filter assembly of claim 2, wherein the axial shaft and the filter element rotate together independent of and relative to the housing.

4. The filter assembly of claim 2, wherein the filter element is a coalescer filter element.

5. The filter assembly of claim 2, further comprising a driving wheel disposed below the filter element, the driving wheel configured to rotate the axial shaft relative to the housing.

6. The filter assembly of claim 5, wherein the upper bearing is disposed between the axial shaft and the housing base and below the filter element, wherein the upper bearing is axially aligned with the lower bearing along the axial shaft.

7. The filter assembly of claim 6, wherein the upper bearing is disposed above the driving wheel and the lower bearing is disposed below the driving wheel.

8. The filter assembly of claim 6, wherein the upper bearing and the lower bearing are disposed between the filter element and the driving wheel.

9. The filter assembly of claim 6, wherein the base cap is positionable within an upper opening of the housing base and above the driving wheel.

10. The filter assembly of claim 9, wherein the shroud prevents the fluid to be filtered from moving into the upper bearing and prevents the bearing lubricant from moving into the filter element.

11. The filter assembly of claim 9, wherein the filter element includes a plurality of blades extending in a plane perpendicular to a longitudinal axis of the axial shaft.

12. The filter assembly of claim 11, wherein the plurality of blades are configured to increase the pumping of the fluid.

13. The filter assembly of claim 2, wherein the lower bearing is disposed within a center hub of the housing base, and wherein the axial shaft rotates within the center hub.

14. The filter assembly of claim 6, further comprising a biasing member between (a) one of the housing base and the axial shaft and (b) one of the lower bearing and the upper bearing.

15. The filter assembly of claim 9, further comprising a first seal between the filter element and at least one of the following:
   the housing base,
   the base cap, and
   a basin.

16. The filter assembly of claim 2, further comprising a basin configured to collect filtered fluid from the filter element.

17. The filter assembly of claim 2, wherein the upper bearing and the lower bearing are fitted to the axial shaft by an axial frame.

18. A filter assembly for use in filtering a fluid, comprising:
   a housing including a housing base and a housing upper portion removably connected to the housing base, the housing sized and configured to contain a filter element therein;
   an axial shaft extending at least partially through the filter element when the filter element is contained within the housing, the filter element fitting upon the axial shaft such that the axial shaft is rotationally coupled with the filter element;
   a lower bearing disposed between the axial shaft and the housing base and below the filter element when the filter element is contained within the housing; and
   the filter element contained within the housing,
   wherein the filter assembly does not include a bearing above the filter element,
   wherein the lower bearing is disposed within a center hub of the housing base, and wherein the axial shaft rotates within the center hub,
   wherein the housing base includes a plurality of ribs radially extending from the center hub to an outer wall of the housing base.

19. The filter assembly of claim 18, wherein a driving wheel is positionable between the ribs and aligned with the axial shaft, the ribs allowing the bearing lubricant to move to and from the driving wheel.

20. A filter assembly for use in filtering a fluid, comprising:
   a housing including a housing base and a housing upper portion removably connected to the housing base, the housing sized and configured to contain a filter element therein;
   an axial shaft extending at least partially through the filter element when the filter element is contained within the housing, the filter element fitting upon the axial shaft such that the axial shaft is rotationally coupled with the filter element;
   a lower bearing disposed between the axial shaft and the housing base and below the filter element when the filter element is contained within the housing;
   the filter element contained within the housing;
   a driving wheel disposed below the filter element and configured to rotate the axial shaft relative to the housing;
   an upper bearing disposed between the axial shaft and the housing base and below the filter element, the upper bearing axially aligned with the lower bearing along the axial shaft,
   wherein the filter assembly does not include a bearing above the filter element,
   wherein the housing base includes a base cap positionable within an upper opening of the housing base and above the driving wheel;
   a first seal between the filter element and at least one of the following:
      the housing base,
      the base cap, and
      a basin; and
   a second seal between the filter element and the housing upper portion.

* * * * *